United States Patent
Burattin et al.

(10) Patent No.: US 6,884,751 B2
(45) Date of Patent: Apr. 26, 2005

(54) PRODUCTION OF HYDROCYANATION CATALYSTS

(75) Inventors: Paolo Burattin, Lyons (FR); Pierre Coqueret, Francheville (FR); Marc Huser, Villeurbanne (FR)

(73) Assignee: Rhodia Feber & Resin Intermedaites, Courbevoie Cedex (FR)

( * ) Notice: Subject to any disclaimer, the term of this patent is extended or adjusted under 35 U.S.C. 154(b) by 373 days.

(21) Appl. No.: 09/886,289

(22) Filed: Jun. 22, 2001

(65) Prior Publication Data

US 2002/0026066 A1 Feb. 28, 2002

Related U.S. Application Data

(63) Continuation of application No. PCT/FR99/03232, filed on Dec. 21, 1999.

(30) Foreign Application Priority Data

Dec. 22, 1998 (FR) .......................................... 98 16469

(51) Int. Cl.[7] ........................... B01J 31/00; B01J 27/26; B01J 27/189
(52) U.S. Cl. .................... 502/162; 502/175; 502/213
(58) Field of Search ................................ 502/162, 175, 502/213

(56) References Cited

U.S. PATENT DOCUMENTS

| 3,496,217 A | | 2/1970 | Drinkard, Jr. et al. |
| 3,655,723 A | | 4/1972 | Drinkard, Jr. |
| 3,686,246 A | | 8/1972 | Burdet et al. |
| 3,850,973 A | | 11/1974 | Seidel et al. |
| 3,925,445 A | | 12/1975 | King et al. |
| 4,087,452 A | | 5/1978 | Kuntz |
| 4,689,437 A | * | 8/1987 | Murray ........................ 502/162 |
| 4,716,138 A | * | 12/1987 | Murray ........................ 502/162 |
| 5,679,237 A | | 10/1997 | Chamard et al. |
| 5,817,848 A | * | 10/1998 | Kamer et al. ................ 502/162 |
| 5,908,805 A | * | 6/1999 | Huser et al. ................. 502/162 |

FOREIGN PATENT DOCUMENTS

| EP | 0 715 890 A1 | * | 6/1996 |
| FR | 2 338 253 | * | 8/1977 |

OTHER PUBLICATIONS

US 2002/0026066 A1, US Pre–Grant publication to Burattin et al., published Feb. 2002.*

* cited by examiner

*Primary Examiner*—Mark L. Bell
*Assistant Examiner*—J. Pasterczyk
(74) *Attorney, Agent, or Firm*—Burns, Doane, Swecker & Mathis, L.L.P.

(57) ABSTRACT

Hydrocyanation catalysts comprising aqueous solutions of at least one water-soluble phosphine and nickel values, well suited for the hydrocyanation of ethylenically unsaturated organic compounds such as diolefins, olefinic nitriles and monolefins, are produced by (a) admixing an aqueous solution of such at least one water-soluble phosphine with a nickel hydroxide, (b) adding hydrogen cyanide or a compound which generates hydrogen cyanide to the mixture thus formed, (c) stirring the resulting mixture until the nickel values have at least partially dissolved, and (d) reducing at least a portion of said nickel values having an oxidation state of greater than zero to the zero oxidation state.

16 Claims, No Drawings

PRODUCTION OF HYDROCYANATION CATALYSTS

CROSS-REFERENCE TO PRIORITY/PCT APPLICATIONS

This application claims priority under 35 U.S.C, §119 of FR-98/16469, filed Dec. 22, 1998, and is a continuation of PCT/FR99/03232, filed Dec. 21, 1999 and designating the United States (published in the French language on Jun. 29, 2000 as WO 00/37174; the title and abstract were also published in English), both hereby expressly incorporated by reference.

CROSS-REFERENCE TO COMPANION APPLICATION

Our copending application Ser. No. 09/886,288, now U.S. Pat. No. 6,469,194, filed concurrently herewith, assigned to the assignee hereof and also expressly incorporated by reference.

BACKGROUND OF THE INVENTION

1. Technical Field of the Invention

The present invention relates to a process for the production/manufacture of a catalyst useful for the hydrocyanation of ethylenically unsaturated organic compounds.

This invention more especially relates to a process for the production/manufacture of a hydrocyanation catalyst comprising, in particular, nickel values and a water-soluble phosphine.

2. Description of the Prior Art

The hydrocyanation reaction, in particular of organic compounds comprising at least one site of ethylenic unsaturation, is an important industrial reaction permitting the preparation of numerous compounds. Thus, this reaction is employed in the synthesis of organic intermediates, such as 3-pentenenitrile, which is converted into monomers such as aminocapronitrile or hexamethylenediamine.

This reaction is described, in particular, in French Patents No. 1,599,761 and No. 2,338,253 and in U.S. Pat. Nos. 3,655,723, 3,850,973, 3,925,445 and 3,686,264.

This reaction is generally carried out in the presence of a catalyst comprising a transition metal. Such catalysts are also described in the above patents.

Thus, French Patent No. 2,338,253 describes a nickel-based catalyst which is formed by an aqueous solution of a water-soluble phosphine comprising nickel values.

This catalyst is obtained via addition, to an aqueous solution of phosphine, of a nickel compound which is soluble or insoluble in water. The amount of nickel in the aqueous phase then corresponds to that of nickel extracted or complexed by the water-soluble phosphine compound. However, in a preferred embodiment, it is advantageous to employ a nickel compound which is soluble in the phosphine/water mixture. Thus, French Patent No. 2,338,253 specifies that the nickel cyanide compound, which is insoluble in water but soluble in the aqueous solution of phosphine, is a preferred compound in the manufacture of such a catalyst. Other compounds, such as organic complexes or salts of nickel, can advantageously be employed to produce the catalyst.

These various methods for the preparation of a hydrocyanation catalyst exhibit the major disadvantage of requiring a nickel compound which may be either very difficult to manufacture with a sufficient degree of purity, or may have a cost and an availability which adversely affect the economics of the industrial scale operation of the hydrocyanation reaction.

SUMMARY OF THE INVENTION

Accordingly, a major object of the present invention is the provision of an improved process for the manufacture of high purity hydrocyanation catalysts from readily available nickel compound starting materials, and which avoids or conspicuously ameliorates the above disadvantages and drawbacks to date characterizing the state of this art.

Briefly, the present invention features a process for the preparation of a catalyst for the hydrocyanation of organic compounds constituted by an aqueous solution of at least one water-soluble phosphine and of nickel, comprising contacting an aqueous solution of a water-soluble phosphine with nickel hydroxide, then adding hydrogen cyanide or a compound which generates hydrogen cyanide to the mixture, maintaining the mixture stirred until the nickel has dissolved and thence subjecting the mixture to a reduction in order to at least partially convert the dissolved nickel to the 0 oxidation state.

DETAILED DESCRIPTION OF BEST MODE AND SPECIFIC/PREFERRED EMBODIMENTS OF THE INVENTION

More particularly according to the present invention, in a preferred embodiment thereof, the reaction mixture, after addition of the hydrogen cyanide, is maintained under stirring at a temperature of less than 100° C., preferably ranging from 2° C. and 80° C.

The amount of hydrogen cyanide added is at least equal to the stoichiometric amount for converting the nickel hydroxide into nickel cyanide.

The amount of hydrogen cyanide added will advantageously range from 30% to 200% greater than the stoichiometric amount.

After at least partial dissolution of the nickel hydroxide, the aqueous solution is subjected to a stage of reduction of the nickel with an oxidation state of greater than zero in order to obtain nickel in the zero oxidation state.

This reduction reaction is advantageously carried out after addition, to the mixture, of a small amount of nickel in the zero oxidation state. Such addition can be carried out by the addition of a small amount of catalyst comprising nickel in the zero oxidation state.

The stage of regeneration of the catalyst, or, stated differently, the reduction of the nickel to the 0 oxidation state, can be carried out by several processes, such as a reduction by gaseous hydrogen, an electrochemical reduction, or addition of an organic or inorganic reducing agent. The reduction processes are known and are described, in particular, in WO 97/24184, EP 0,715,890 and FR 1,599,761.

The amount of nickel compound utilized is advantageously selected such that there is, per liter of reaction solution, from $10^{-4}$ to 1, and preferably from 0.005 to 0.5, mol of nickel.

The amount of water-soluble phosphine used to prepare the reaction solution is advantageously selected such that the number of moles of this compound with respect to 1 mol of nickel ranges from 0.5 to 2,000 and preferably from 2 to 300.

Suitable water-soluble phosphine compounds include those compounds described in FR-2,338,253 or in WO 97/12857 and EP 0,650,959. These are exemplary only and not limiting.

Thus, suitable phosphines according to this invention have the following structural formula (I):

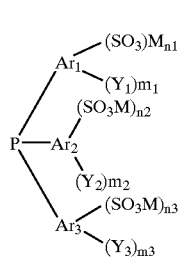

in which $Ar_1$, $Ar_2$ and $Ar_3$, which may be identical or different, are each an aryl radical; $Y_1$, $Y_2$ and $Y_3$, which may be identical or different, are each an alkyl radical having from 1 to 4 carbon atoms, an alkoxy radical having from 1 to 4 carbon atoms, a halogen atom, a CN group, an $NO_2$ group, an OH group, an $NR_1R_2$ radical, wherein $R_1$ and $R_2$, which may be identical or different, are each an alkyl radical having from 1 to 4 carbon atoms; M is an inorganic or organic cationic residue selected, such that the compound of formula (I) is soluble in water, from the group consisting of $H^+$, cations derived from alkali metals or alkaline earth metals, $N(R_3R_4R_5R_6)^+$, wherein $R_3$, $R_4$, $R_5$ and $R_6$, which may be identical or different, are each an alkyl radical having from 1 to 4 carbon atoms or a hydrogen atom, and other metal cations, the benzenesulfonic acid salts of which are soluble in water; $m_1$, $m_2$ and $m_3$ which may be identical or different, are each an integer ranging from 0 to 5; and $n_1$, $n_2$ and $n_3$, which may be identical or different, are each an integer ranging from 0 to 3, at least one of these being equal to or greater than 1.

Exemplary metals, the benzenesulfonic acid salts of which are soluble in water, include lead, zinc and tin.

By the expression "soluble in water" is generally intended a compound soluble to at least 0.01 g per liter of water.

Preferred phosphines of formula (I) are those in which:

$Ar_1$, $Ar_2$ and $Ar_3$ are phenyl radicals;

$Y_1$, $Y_2$ and $Y_3$ are alkyl radicals having from 1 to 2 carbon atoms, or alkoxy radicals having from 1 to 2 carbon atoms;

M is a cation selected from the group consisting of $H^+$, cations derived from Na, K, Ca and Ba, $NH_4^+$, and tetramethylammonium, tetraethylammonium, tetrapropylammonium and tetrabutylammonium cations;

$m_1$, $m_2$ and $m_3$ are integers ranging from 0 to 3; and $n_1$, $n_2$ and $n_3$ are integers ranging from 0 to 3, at least one also being greater than 1.

The more particularly preferred phosphines are the sodium, potassium, calcium, barium, ammonium, tetramethylammonium and tetraethylammonium salts of mono(sulfophenyl)diphenylphosphine, di(sulfophenyl)phenylphosphine and tri(sulfophenyl)phosphine, in which the $SO_3$ groups are preferably in the meta-position.

Exemplary phosphines of formula (I) according to the process of the invention are alkali metal or alkaline earth metal salts, ammonium salts, or quaternary ammonium salts of (3-sulfo-4-methylphenyl)di(4-methylphenyl)phosphine, (3-sulfo-4-methoxyphenyl)di(4-methoxyphenyl)phosphine, (3-sulfo-4-chlorophenyl)di(4-chlorophenyl)phosphine, di(3-sulfophenyl)phenylphosphine, di(4-sulfophenyl)phenylphosphine, di(3-sulfo-4-methylphenyl)(4-methylphenyl)phosphine, di(3-sulfo-4-methoxyphenyl)(4-methoxyphenyl)phosphine, di(3-sulfo-4-chlorophenyl)(4-chlorophenyl)phosphine, tri(3-sulfophenyl)phosphine, tri(4-sulfophenyl)phosphine, tri(3-sulfo-4-methylphenyl)phosphine, tri(3-sulfo-4-methoxyphenyl)phosphine, tri(3-sulfo-4-chlorophenyl)phosphine, (2-sulfo-4-methylphenyl)(3-sulfo-4-methylphenyl)(3,5-disulfo-4-methylphenyl)phosphine or (3-sulfophenyl)(3-sulfo-4-chlorophenyl)(3,5-disulfo-4-chlorophenyl)phosphine.

A mixture of these phosphines can of course be employed, in particular a mixture of mono-, di- and tri-meta-sulfonated phosphines.

Monodentate and bidentate phosphines having the following structural formulae (II) and (III) are also suitable according to the present invention:

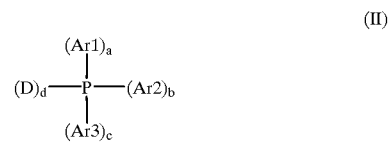

in which Ar1 and Ar2, which may be identical or different, are each aryl radicals or substituted such aryl radicals bearing one or more substituents, such as alkyl or alkoxy radicals having from 1 to 4 carbon atoms, halogen atoms, hydrophilic groups, such as —COOM, —$SO_3M$ or —$PO_3M$, wherein M is an inorganic or organic cationic residue selected from among hydrogen, cations derived from alkali metals or alkaline earth metals, ammonium cations —$N(R)_4$, wherein the radicals R, which may be identical or different, are each a hydrogen atom or an alkyl radical having from 1 to 4 carbon atoms, and other cations derived from metals, the arylcarboxylic acid, arylsulfonic acid or arylphosphonic acid salts of which are soluble in water, —$N(R)_4$, wherein the radicals R, which may be identical or different, are each a hydrogen atom or an alkyl radical having from 1 to 4 carbon atoms, or —OH; $Ar_3$ is a substituted aryl radical bearing one or more substituents, such as alkyl or alkoxy radicals having from 1 to 4 carbon atoms, halogen atoms, hydrophilic groups, such as —COOM or —$PO_3M$, wherein M is an inorganic or organic cationic residue selected from among hydrogen, cations derived from alkali metals or alkaline earth metals, ammonium cations —$N(R)_4$, wherein the radicals R, which may be identical or different, are each a hydrogen atom or an alkyl radical having from 1 to 4 carbon atoms, and other metal cations, the arylcarboxylic acid or arylphosphonic acid salts of which are soluble in water, $N(R)_4$, wherein the radicals R, which may be identical or different, are each a hydrogen atom or an alkyl radical having from 1 to 4 carbon atoms, or —OH, with the proviso that at least one of the substituents of $Ar_3$ is a hydrophilic group as defined above; a is 0 or 1; b is 0 or 1; c is an integer ranging from 0 to 3; D is an alkyl radical, a cycloalkyl radical or an alkyl or cycloalkyl radical substituted by one or more substituents, such as an alkoxy radical having from 1 to 4 carbon atoms, a halogen atom, a hydrophilic group, such as —COOM, —$SO_3M$ or —$PO_3M$, wherein M is an inorganic or organic cationic residue selected from among hydrogen, cations derived from alkali metals or alkaline earth metals, ammonium cations —$N(R)_4$, wherein the radicals R, which may be identical or different, are each a hydrogen atom or an alkyl radical having from 1 to 4 carbon atoms, and other metal cations, the arylcarboxylic acid, arylsulfonic acid or arylphosphonic acid salts of which are soluble in water, —$N(R)_4$, wherein the radicals R, which may be identical or different, are each a hydrogen atom or an alkyl radical having from 1 to 4 carbon atoms, or —OH; d is an integer ranging from 0 to 3; and the sum (a+b+c+d) is equal to 3; and

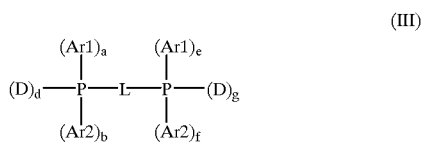

(III)

in which Ar1, Ar2 and D are as defined above for the formula (II); a, b, e, and f are each 0 or 1; d and g are each an integer ranging from 0 to 2; the sum (a+b+d) is equal to 2; the sum (e+f+g) is equal to 2; and L is a single valency bond or a divalent hydrocarbonaceous radical, such as an alkylene radical, a cycloalkylene radical, an arylene radical, or a radical deriving from a heterocycle comprising one or two oxygen, nitrogen or sulfur atoms in the ring, these various cyclic radicals being bonded directly to one of the phosphorus atoms or both phosphorus atoms or being bonded to one of the phosphorus atoms or to both via a linear or branched alkylene radical having from 1 to 4 carbon atoms, with the proviso that the ring or rings which are optionally moieties of the divalent radical L may comprise one or more substituents, such as an alkyl radical having from 1 to 4 carbon atoms.

By the expression "soluble in water" is intended a compound soluble to at least 0.01 g per liter of water.

Exemplary phosphines of structural formula (II) include tris(hydroxymethyl)phosphine, tris(2-hydroxyethyl) phosphine, tris(3-hydroxypropyl)phosphine, tris(2-carboxymethyl)phosphine, the sodium salt of tris(3-carboxyphenyl)phosphine, tris(3-carboxyethyl)phosphine, tris(4-trimethylammoniophenyl)phosphine iodide, the sodium salt of tris(2-phosphonoethyl)phosphine or bis(2-carboxyethyl)phenylphosphine.

And exemplary phosphines of structural formula (III) include the sodium salt of 2,2'-bis[di(sulfophenyl) phosphino]-1,1'-binaphthyl, the sodium salt of 1,2-bis[di (sulfophenyl)phosphinomethyl]cyclobutane (CBDTS), 1,2-bis(dihydroxymethylphosphino)ethane, 1,3-bis (dihydroxymethylphosphino)propane, or the sodium salt of 2,2'-bis[di(sulfophenyl)phosphinomethyl]-1,1'-binaphthyl.

Certain of the water-soluble phosphines of formulae (I) to (III) are commercially available.

For the preparation of the others, reference is made to the general or specific processes for the synthesis of phosphines described in the general literature, such as Houben-Weyl, *Methoden der organischen Chemie*, "organische Phosphor Verbindungen" [*Methods of Organic Chemistry*, "Organic Phosphorus Compounds"], Part 1(1963).

Lastly, for the preparation of water-soluble derivatives which have not been described, starting from phosphines not comprising water-soluble substituents described above, one or more of these hydrophilic substituents are introduced. Thus, sulfonate groups, for example, may be introduced by the reaction of $SO_3$ in sulfuric acid. Carboxylate, phosphonate and quaternary ammonium groups can likewise be introduced via the usual chemical techniques for this type of synthesis.

The ethylenically unsaturated organic compounds which can be subjected to hydrocyanation in the presence of a catalyst prepared according to the process of the invention are typically diolefins, such as butadiene, isoprene, 1,5-hexadiene or 1,5-cyclooctadiene; ethylenically unsaturated aliphatic nitriles, particularly linear pentenenitriles, such as 3-pentenenitrile or 4-pentenenitrile; monoolefins, such as styrene, methylstyrene, vinylnaphthalene, cyclohexene or methylcyclohexene; and mixtures of several of these compounds.

The pentenenitriles, in particular, can contain amounts, generally minor amounts, of other compounds, such as 2-methyl-2-butenenitrile, 2-methyl-2-butenenitrile, 2-pentenenitrile, valeronitrile, adiponitrile, 2-methylglutaronitrile, 2-ethylsuccinonitrile or butadiene, originating, for example, from the prior hydrocyanation reaction of butadiene.

Not insignificant amounts of 2-methyl-3-butenenitrile and 2-methyl-2-butenenitrile are formed, with the linear pentenenitriles, during the hydrocyanation of butadiene.

The process for the preparation of a catalytic solution in accordance with the invention is, in a preferred embodiment, carried out before the introduction of the catalytic solution into the reaction region for the hydrocyanation of an ethylenically unsaturated organic compound.

The hydrocyanation reaction is generally carried out at a temperature ranging from 10° C. to 200° C. and preferably from 30° C. to 120° C.

The process of the invention can be carried out continuously or batchwise.

The hydrogen cyanide employed can be prepared from metal cyanides, in particular sodium cyanide, or from cyanohydrins.

The hydrogen cyanide is introduced into the reactor in the gaseous state or in the liquid state. It can also be dissolved beforehand in an organic solvent.

As regards a batchwise process, it is possible to charge into a reactor which has been purged beforehand using an inert gas (such as nitrogen or argon) either an aqueous solution comprising all or a fraction of the various constituents, such as the water-soluble phosphine, the transition metal compound, the optional reducing agent and the optional solvent, or introducing said constituents separately. Generally, the reactor is then heated to the desired temperature and then the compound to be hydrocyanated is introduced. The hydrogen cyanide is then itself introduced, preferably continuously and uniformly.

When the reaction (the progress of which can be monitored by quantitative determination of samples withdrawn) has been completed, the reaction mixture is withdrawn after cooling and the reaction products are isolated by separation via settling, optionally followed by extraction of the aqueous layer with an appropriate solvent, such as, for example, the abovementioned water-immiscible solvents.

The aqueous catalytic solution can then be recycled to a fresh reaction for the hydrocyanation of organic compounds comprising at least one ethylenic double bond, after having been optionally treated by a regeneration process.

It is also possible to use the catalyst in combination with a Lewis acid.

The Lewis acid comprising the cocatalyst makes it possible in particular, in the case of the hydrocyanation of ethylenically unsaturated aliphatic nitriles, to improve the linearity of the dinitriles obtained, namely, the percentage of linear dinitrile with respect to all of the dinitriles formed, and/or to increase the lifetime of the catalyst.

By the term "Lewis acid" is intended the usual definition, namely, compounds which are electron-pair acceptors.

The Lewis acids noted in the work edited by G. A. Olah, "Friedel-Crafts and Related Reactions", Volume I, pages 191 to 197 (1963), are particularly representative.

The Lewis acids which can be employed as cocatalysts in the subject process are advantageously selected from among compounds of the elements from Groups Ib, IIb, IIIa, IIIb, IVa, IVb, Va, Vb, VIb, VIIb and VIII of the Periodic Classification of the Elements, insofar as said compounds are at least partially soluble in water. These compounds are generally salts, in particular halides, preferably chlorides and bromides, sulfates, carboxylates and phosphates.

Exemplary such Lewis acids include zinc chloride, zinc bromide, zinc iodide, manganese chloride, manganese bromide, cadmium chloride, cadmium bromide, stannous chloride, stannous bromide, stannous sulfate, stannous tartrate, chlorides or bromides of rare earth metal elements, such as lanthanum, cerium, praseodymium, neodymium, samarium, europium, gadolinium, terbium, dysprosium, holmium, erbium, thulium, ytterbium and lutetium, cobalt chloride, ferrous chloride or yttrium chloride.

It is, of course, possible to employ mixtures of several Lewis acids.

It is also advantageous, if appropriate, to stabilize the Lewis acid in aqueous solution by the addition of an alkali metal or alkaline earth metal halide, such as lithium chloride, sodium chloride, calcium chloride or magnesium chloride, in particular. The alkali metal or alkaline earth metal halide/Lewis acid molar ratio varies very widely, for example from 0 to 100, it being possible for the specific ratio to be adjusted depending on the stability of the Lewis acid in water.

Very particularly preferred Lewis acids include zinc chloride, zinc bromide, stannous chloride, stannous bromide, stannous chloride stabilized with lithium chloride, stannous chloride stabilized with sodium chloride and zinc chloride/stannous chloride mixtures.

The Lewis acid cocatalyst employed generally constitutes from 0.01 to 50 mol per mole of nickel compound and preferably from 1 to 10 mol per mole.

As regards the implementation of the process of the invention, the catalytic solution employed for the hydrocyanation in the presence of Lewis acid can be prepared before it is introduced into the reaction region, for example by addition, to the aqueous solution of the water-soluble phosphine, of the appropriate amount of nickel hydroxide, of the Lewis acid and optionally of the reducing agent.

It is also possible, under the conditions of the hydrocyanation process of the present invention, and in particular by carrying out the reaction in the presence of the catalyst described above comprising at least one water-soluble phosphine and at least one nickel compound, to isomerize 2-methyl-3-butenenitrile to pentenenitriles in the absence of hydrogen cyanide.

The 2-methyl-3-butenenitrile subjected to the isomerization according to the invention can be employed alone or as a mixture with other compounds.

Thus, it is possible to employ 2-methyl-3-butenenitrile as a mixture with 2-methyl-2-butenenitrile, 4-pentenenitrile, 3-pentenenitrile, 2-pentenenitrile, butadiene, adiponitrile, 2-methylglutaronitrile, 2-ethylsuccinonitrile or valeronitrile.

Thus, it is particularly advantageous to treat the reaction mixture originating from the hydrocyanation of butadiene with HCN in the presence of an aqueous solution of at least one water-soluble phosphine and of at least one nickel compound, more preferably of a nickel compound in the 0 oxidation state, as described above.

In this preferred embodiment, as the catalytic system is already present for the hydrocyanation reaction of butadiene, it is sufficient to terminate any introduction of hydrogen cyanide in order to allow the isomerization reaction to take place.

It is possible, if appropriate in this embodiment, to gently flush the reactor using an inert gas, such as nitrogen or argon, for example, in order to drive off the hydrocyanic acid which might still be present.

The isomerization reaction is generally carried out at a temperature of from 10C. to 200° C. and preferably from 60° C. to 120° C.

In the preferred embodiment of an isomerization immediately following the hydrocyanation reaction of butadiene, it will be advantageous to carry out the isomerization at the temperature at which the hydrocyanation has been carried out.

As regards the process for the hydrocyanation of ethylenically unsaturated compounds, the catalytic solution used for the isomerization can be prepared before it is introduced into the reaction zone, for example by addition, to the aqueous solution of a water-soluble phosphine, of the appropriate amount of nickel compound and optionally of the reducing agent. It is also possible to prepare the catalytic solution in situ by simple mixing of these various constituents. The amount of nickel compound and the amount of water-soluble phosphine are the same as for the hydrocyanation reaction. This catalyst can also be prepared by the process of the invention before it is introduced into the reaction zone.

Although the isomerization reaction is generally carried out without a third solvent, it can be advantageous to add an inert water-immiscible organic solvent which can be that of the subsequent extraction. This is, in particular, the case when such a solvent has been employed in the hydrocyanation reaction of butadiene which has been used to prepare the mixture subjected to the isomerization reaction. Such solvents are advantageously selected from among those which have been indicated above for the hydrocyanation.

At the end of the reaction, it is very easy to separate the catalyst from the isomerization reaction products, as has been indicated for the hydrocyanation, and to recycle it, if appropriate, in one of the hydrocyanation reactions described above or in a fresh isomerization reaction, after treatment of the aqueous phase and/or of the solid phase according to the process of the invention with hydrogen cyanide in order to dissolve said solid phase.

In order to further illustrate the present invention and the advantages thereof, the following specific examples are given, it being understood that same are intended only as illustrative and in nowise limitative.

EXAMPLE 1

150 cm$^3$ of a 1 mol/liter aqueous nickel chloride solution were charged into a 1 liter Erlenmeyer flask equipped with a magnetic bar. 170 cm$^3$ of a 2 mol/liter aqueous sodium hydroxide solution were introduced, with stirring at room temperature, over a period of 3 hours and then the mixture was maintained stirred for 1 hour. The system was subsequently maintained standing for the time necessary for the nickel hydroxide precipitated to settle out and for the supernatant aqueous solution to become clear. The nickel hydroxide precipitate was then washed. To accomplish this, as much as possible of the supernatant aqueous phase was siphoned off, 200 ml of distilled water were added, stirring of the system was resumed for 1 hour and then the system was again maintained standing for the time necessary for the separation by settling of the solid phase; this series of operations was repeated until a supernatant aqueous phase of neutral pH was obtained. The solid phase was then recovered by filtration through a sintered glass of porosity 4. Said filtration was carried out so as to obtain the nickel hydroxide in the form of a paste which will be subsequently described as freshly precipitated and wet nickel hydroxide. Quantitative determination of the Ni on 3 withdrawn samples of this wet paste stored in a closed container resulted in a mean assay by weight of 25.2 wgt % of Ni.

57.5 g of a 30 wgt % solution of sodium salt of trisulfonated triphenylphosphine (TSTPP) in water were charged into a 150 cm³ glass reactor purged with argon and equipped with an auto-suction turbine. This solution was degassed. 1.445 g of freshly precipitated and wet nickel hydroxide obtained above were subsequently introduced. With stirring (1,200 revolutions/minute) and at room temperature, 0.640 ml of hydrocyanic acid was injected into the reactor head space, with a constant flow rate and over a duration of one hour, via a syringe thermostatically controlled at −10° C. During the injection of the HCN, the solution rapidly became orangey and then red. After injection, the mixture was maintained stirred for 3 hours at 80° C. and then cooled to room temperature, where it was maintained stirred for 12 hours. After flushing the head space of the reactor with argon for approximately 1 hour, a homogeneous and clear solution with a dark red coloration was recovered. Quantitative determination of the Ni on a withdrawn sample filtered by means of a Millipore Millex-HV® filter (Hydrophilic PVDF, 0.45 μm) provided the following result: 106 mmol/kg.

The solution thus recovered could be used as catalytic solution after having been subjected to a stage of electrochemical reduction after addition of nickel in the (0) oxidation state.

EXAMPLE 2

57.8 g of a 30 wgt % solution of sodium salt of trisulfonated triphenylphosphine (TSTPP) in water were charged into a 150 cm³ glass reactor purged with argon and equipped with an auto-suction turbine. This solution was degassed. 606 mg of a commercial nickel hydroxide (Aldrich) comprising approximately 61 wgt % of Ni were subsequently introduced. With stirring (1,200 revolutions/minute) and at room temperature, 0.640 ml of hydrocyanic acid was injected into the reactor head space, with a constant flow rate and over a duration of one hour, via a syringe thermostatically controlled at −10° C. During the injection of the HCN, the solution rapidly became orangey and then red. After injection, the mixture was maintained stirred for 3 hours at 80° C. and then cooled to room temperature, where it was maintained stirred for 12 hours. After flushing the head space of the reactor with argon for approximately 1 hour, a homogeneous and clear solution with a dark red coloration was recovered. Quantitative determination of the Ni on a withdrawn sample filtered by means of a Millipore Millex-HV® filter (Hydrophilic PVDF, 0.45 μm) provided the following result: 103 mmol/kg.

The solution thus recovered could be used as catalytic solution after having been subjected to a stage of electrochemical reduction after addition of nickel in the (0) oxidation state.

While the invention has been described in terms of various specific and preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a hydrocyanation catalyst comprising an aqueous solution of at least one water-soluble phosphine and nickel, said process comprising; (a) admixing an aqueous solution of said at least one water-soluble phosphine with a nickel hydroxide to form a mixture, (b) adding hydrogen cyanide or a compound which generates hydrogen cyanide to the mixture thus formed, (c) stirring the resulting mixture until the nickel hydroxide is at least partially dissolved, and (d) reducing at least a portion of the nickel of said at least partially disolved nickel hydroxide to the zero oxidation state.

2. The process as defined by claim 1, comprising maintaining stirring in step (c) at a temperature of less than 100° C.

3. The process as defined by claim 2, comprising maintaining stirring in step (c) at a temperature ranging from 20° C. to 80° C.

4. The process as defined by claim 1, comprising adding nickel in the zero oxidation state to the mixture prior to the reduction stage (d) thereof.

5. The process as defined by claim 1, wherein the hydrogen cyanide in step (b) is added in an amount at least equal to the stoichiometric amount for converting nickel hydroxide into nickel cyanide.

6. The process as defined by claim 5, wherein the amount of hydrogen cyanide added in step (b) is a 30% to 200% stoichiometric excess of the amount of hydrogen cyanide for converting nickel hydroxide into nickel cyanide.

7. The process as defined by claim 1, wherein the amount of said at least one water-soluble phosphine, expressed as number of moles per 1 mol of nickel, ranges from 0.5 and 2,000.

8. The process as defined by claim 7, wherein said amount ranges from 2 to 300.

9. The process as defined by claim 1, wherein step (d) comprises reducing said nickel with gaseous hydrogen.

10. The process as defined by claim 1, wherein step (d) comprises reducing said nickel electrochemically.

11. The process as defined by claim 1, wherein step (d) comprises reducing said nickel with an organic/inorganic reducing agent.

12. The process as defined by claim 1, wherein said at least one water-soluble phosphine having the structural formula (I):

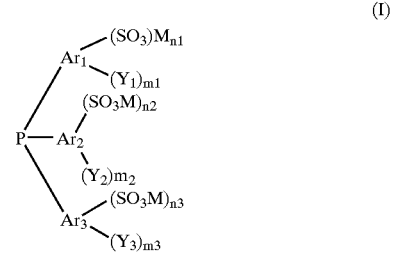

in which $Ar_1$, $Ar_2$ and $Ar_3$, which are identical or different, are each an aryl radical; $Y_1$, $Y_2$ and $Y_3$, which are identical or different, are each an alkyl radical having from 1 to 4 carbon atoms, an alkoxy radical having from 1 to 4 carbon atoms, a halogen atom, a CN group, an $NO_2$ group, an OH group, an $NR_1R_2$ radical, wherein $R_1$ and $R_2$, which are identical or different, are each an alkyl radical having from 1 to 4 carbon atoms; M is an inorganic or organic cationic residue selected, such that the compound of formula (I) is soluble in water, from the group consisting of $H^+$, cations derived from alkali metals or alkaline earth metals, $N(R_3R_4R_5R_6)+$, wherein $R_3$, $R_4$, $R_5$ and $R_6$, which are identical or different, are each an alkyl radical having from 1 to 4 carbon atoms or a hydrogen atom, and metal cations, the benzenesulfonic acid salts of which are soluble in water; $m_1$, $m_2$ and $m_3$ which are identical or different, are each an integer ranging from 0 to 5; and $n_1$, $n_2$ and $n_3$, which are identical or different, are each an integer ranging from 0 to 3, at least one of these being equal to or greater than 1.

13. The process as defined by claim 12, wherein said at least one water-soluble phosphine having the structural formula (I) comprising an alkali metal or alkaline earth metal salt, ammonium salt, or quaternary ammonium salt of (3-sulfo-4-methylphenyl)di(4-methylphenyl)phosphine, (3-sulfo-4-methoxyphenyl)di(4-methoxyphenyl)phosphine, (3-sulfo-4-chlorophenyl)di(4-chlorophenyl)phosphine, di(3-sulfophenyl)phenylphosphine, di(4-sulfophenyl)phenylphosphine, di(3-sulfo-4-methylphenyl)(4-methylphenyl)phosphine, di(3-sulfo-4-methoxyphenyl)(4-methoxyphenyl)phosphine, di(3-sulfo-4-chlorophenyl)(4-chlorophenyl)phosphine, tri(3-sulfophenyl)phosphine, tri(4-sulfophenyl)phosphine, tri(3-sulfo-4-methylphenyl)phosphine, tri(3-sulfo-4-methoxyphenyl)phosphine, tri(3-sulfo-4-chlorophenyl)phosphine, (2-sulfo-4-methylphenyl)(3-sulfo-4-methylphenyl)(3,5-disulfo-4-methylphenyl)phosphine or (3-sulfophenyl)(3-sulfo-4-chlorophenyl)(3,5-disulfo-4-chlorophenyl)phosphine.

14. A hydrocyanation catalyst comprising an aqueous solution of at least one water-soluble phosphine and nickel, wherein said catalyst is prepared by the process which comprises (a) admixing an aqueous solution of said at least one water-soluble phosphine with a nickel hydroxide to form a mixture, (b) adding hydrogen cyanide or a compound which generates hydrogen cyanide to the mixture thus formed, (c) stirring the resulting mixture until the nickel hydroxide is at least partially dissolved, and (d) reducing at least a portion of the nickel of said at least partially dissolved nickel hydroxide to the zero oxidation state.

15. The process as defined by claim 1, wherein said at least one water-soluble phosphine has the structural formula (II) or (III):

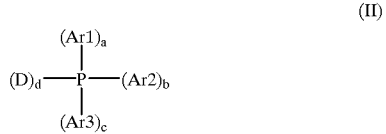

in which Ar1 and Ar2, which are identical or different, are each aryl radicals or substituted aryl radicals bearing one or more of the following substituents: OH; $N(R)_2$ wherein the radicals R which are identical or different, are each a hydrogen atom or an alkyl radical having 1 to 4 carbon atoms; halogen atoms; alkyl or alkoxy radicals having from 1 to 4 carbons atoms; or the hydrophilic groups —COOM, —$SO_3M$ or —$PO_3M$, wherein M is an inorganic or organic cationic residue selected from the group consisting of hydrogen, cations derived from alkali metals and alkaline earth metals, ammonium cations $N(R)_4^+$ wherein the radicals R, which are identical or different, are each a hydrogen atom or an alkyl radical having from 1 to 4 carbon atoms, and cations derived from metals, the arylcarboxylic acid, arylsulfonic acid or arylphosphonic acid salts of which are soluble in waterl; Ar3 is a substituted aryl radical bearing one or more of the following substituents: OH; $N(R)_2$ wherein the radicals R which are identical or different, are each a hydrogen atom or an alkyl radical of 1 to 4 carbon atoms; halogen atoms; alkyl or alkoxy radicals having from 1 to 4 carbon atoms; or the hydrophilic groups —COOM or —$PO_3M$, wherein M is an inorganic or organic cationic residue selected from the group consisting of hydrogen, cations derived from alkali metals and alkaline earth metals, ammonium cations $N(R)_4^+$, wherein the radicals R, which are identical or different, are each a hydrogen atom or an alkyl radical having from 1 to 4 carbon atoms, and metal cations, the arylcarboxylic acid or arylphosphonic acid salts of which are soluble in water; with the proviso that at least one of the substituents of Ar3 is a hydrophilic group as defined above; a is 0 or 1; b is 0 or 1; c is an integer ranging from 0 to 3; D is an alkyl radical, a cycloalkyl radical or an alkyl or cycloalkyl radical substituted by one or more of the following substituents: OH; $N(R)_2$ wherein the radicals R which are identical or different, are each a hydrogen atom or an alkyl radical having from 1 to 4 carbon atoms; a halogen atom; alkyl or alkoxy radicals having from 1 to 4 carbon atoms; or a hydrophilic group —COOM, —$SO_3M$ or —$PO_3M$, wherein M is an inorganic or organic cationic residue selected from the group consisting of hydrogen, cations derived from alkali metals and alkaline earth metals, ammonium cations $N(R)_4^+$, wherein the radicals R, which are identical or different, are each a hydrogen atom or an alkyl radical having from 1 to 4 carbon atoms, and metal cations, the arylcarboxylic acid, arylsulfonic acid or arylphosphonic acid salts of which are soluble in water; d is an integer ranging from 0 to 3; and the sum (a+b+c+d) is to 3;

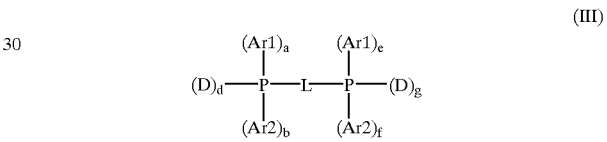

in which Ar1, Ar2 and D are as defined above for the formula (II); a, b, e, and f are each 0 or 1; d and g are each an integer ranging from 0 to 2; the sum (a+b+d) is equal to 2; the sum (e+f+g) is equal to 2; and L is a single bond between the two P atoms or a divalent hydrocarbyl radical, or a radical derived from a heterocycle comprising one or two oxygen, nitrogen or sulfur atoms in the ring, said heterocycle radical being bonded directly to one of the phosphorus atoms or both phosphorus atoms of (III) or being bonded to one of the phosphorus atoms or to both via a linear or branched alkylene radical having from 1 to 4 carbon atoms, with the proviso that the ring or rings which are optionally moieties of the divalent radical L optionally bear one or more substituents.

16. The process as defined by claim 15, wherein said at least one water-soluble phosphine having the structural formula (II) or (III) comprising tris(hydroxymethyl)phosphine, tris(2-hydroxyethyl)phosphine, tris(3-hydroxypropyl)phosphine, tris(2-carboxyethyl)phosphine, a sodium salt of tris(3-carboxyphenyl)phosphine, tris(3-carboxypropyl)phosphine, tris(4-trimethylammoniumphenyl)phosphine iodide, the sodium salt of tris(2-phosphonoethyl)phosphine, bis(2-carboxyethyl)phenylphosphine, a sodium salt of 2,2'-bis[di(sulfophenyl)phosphino]-1,1'-binaphthyl, a sodium salt of 1,2-bis[di(sulfophenyl)phosphinomethyl]cyclobutane (CBDTS), 1,2-bis(dihydroxymethylphosphino)ethane, 1,3-bis(dihydroxymethylphosphino)propane, or a sodium salt of 2,2'-bis[di(sulfophenyl)phosphinomethyl]-1,1'-binaphthyl.

* * * * *